United States Patent
Hosokawa et al.

[11] Patent Number: 6,102,823
[45] Date of Patent: Aug. 15, 2000

[54] TOOTHED POWER TRANSMISSION BELT

[75] Inventors: Yasutoshi Hosokawa, Kakogawa; Akiyoshi Homan, Kobe; Kiyokazu Wada, Miki; Koji Matsuo; Isao Koyama, both of Kobe; Shinichi Takagi, Nishinomiya; Mitsuo Ishikawa, Kobe, all of Japan

[73] Assignee: Mitsuboshi Belting Ltd., Kobe, Japan

[21] Appl. No.: 07/958,240

[22] Filed: Oct. 7, 1992

[30] Foreign Application Priority Data

Dec. 12, 1991 [JP] Japan ................................. 3-110035

[51] Int. Cl.[7] ............................................. F16G 1/21
[52] U.S. Cl. ................................................. 474/242
[58] Field of Search ................................. 474/240, 241, 474/242, 243, 244, 265, 238

[56] References Cited

U.S. PATENT DOCUMENTS

| | | | |
|---|---|---|---|
| 4,579,547 | 4/1986 | McComber et al. | 474/242 E |
| 4,950,212 | 8/1990 | Masuda et al. | 474/242 |
| 5,007,884 | 4/1991 | Masuda et al. | 474/242 |

*Primary Examiner*—Michael Buiz
*Attorney, Agent, or Firm*—Wood, Phillips, VanSanten, Hoffman & Ertel

[57] ABSTRACT

A power transmission belt having a center belt with a length, an inside surface, and an outside surface. Upper and lower blocks are provided and each has a leading face, a trailing face, and laterally oppositely facing pulley-engaging side surfaces. The upper and lower blocks are connected to each other to maintain the upper block, lower block and center belt together in an operative relationship without penetrating the center belt. At least one of the pulley-engaging side surfaces on at least one of the upper and lower blocks is uninterrupted between the leading and trailing faces on the one of the upper and lower blocks so that the at least one side surface can engage a cooperating pulley surface along an uninterrupted line between the leading and trailing faces of the at least one side surface.

32 Claims, 6 Drawing Sheets

TOOTHED POWER TRANSMISSION BELT

BACKGROUND OF THE INVENTION

1. Field of the Invention

This invention relates to endless power transmission belts having regularly longitudinally spaced blocks on an endless center belt and, more particularly, to structure for connecting the blocks to the center belt to provide a long lasting belt with high force transmission capabilities.

2. Background Art

Toothed power transmission belts are commonly used in environments wherein the belts will be subjected to heavy loading. It is known to construct a belt of this type by providing a center belt section and attaching blocks on oppositely facing surfaces of the center belt section to define equidistantly spaced drive teeth.

One known method of connecting the blocks to the center belts involves the use of bolts or rivets which are directed through an upper and lower block pair and a center belt, which is captively held between the blocks in the pair. This arrangement has accounted for secure holding of the blocks to the center belt. Belts of this construction have exhibited relatively good strength in, for example, high load transmissions.

One problem with the above prior art belt construction is that the bolts or rivets, which secure the blocks to the center belt, must pass through the center belt. Holes in the center belt may appreciably weaken the center belt. A still further problem with the above prior art belt construction is that the fabrication thereof requires a large number of assembly steps. Holes must be pre-bored in the blocks and center belt. This may be a labor intensive process that requires great precision. Further, the bolts and rivets must be secured in separate steps. Both operations are sufficiently involved that the cost of assembly may be relatively high.

To avoid the above problem of center belt weakening, the assignee herein developed a belt construction in which the blocks are rigidly fixed to a center belt without any penetration of the center belt by the block fasteners. This structure, which is disclosed in Japanese Patent Publication No. 1-261138, has proven to be economical to manufacture and successful in use.

While the block fasteners in this last belt construction do not weaken the center belt, they are fastened such that the surface area of the pulley-engaging side surfaces of the belt blocks is reduced. More particularly, the fasteners are in the form of a wire which is wrapped in a direction transversely to the belt length within a groove/recess defined by an undercut continuously around the belt in both the upper and lower blocks.

The undercut at the pulley-engaging side surfaces of the blocks has two detrimental effects. First of all, the undercut reduces the contact area between the side surfaces and a cooperating pulley and thereby diminishes the force which the belt can transmit through friction between the block side surfaces and a cooperating pulley. Slippage of the belt may also occur which abrades the side surfaces of the belt blocks to reduce belt life.

Secondly, the undercut reduces the thickness of the blocks to diminish the block rigidity. This affects the force transmission capabilities as well as reducing the length of the useful belt life.

It is further known to construct center belts from a polymeric material that has load-carrying cords embedded therein. The load-carrying cords are preferably formed by spirally wrapping a cord made of aramid fiber, polyester fiber, or the like.

Because the cords are wrapped in a spiral path, the length of the cords is not fully aligned with the length of the belt. The stability of the belt, during running, is thus adversely affected. Vibrations and/or shocks may be induced to the system as a result of this construction. Another problem with spirally wrapped cords is that the tension applied to the belt may only be transmitted through some of the cords. Inconsistency in belt performance, from one to the next, may result. The life of the belt may thus be unpredictable.

The above problem is aggravated when a fastener is extended, through the center belt and mounting blocks thereon. In belts utilizing bolts, rivets or the like, the center belt is typically pre-drilled. During this operation, one or more of the load-carrying cords may be partially cut or altogether severed. As a consequence, the strength of the belt in the longitudinal direction is diminished. Because of the spiral arrangement of the load-carrying cords, the weakening due to the center belt bore is not only localized lengthwise parallel to the bores but also extends laterally outwardly a significant distance from the bores.

Another problem that is encountered with prior art belts results from the connection of the blocks with multiple fasteners. The belt may be made undesirably wide strictly to accommodate the multiple fasteners.

SUMMARY OF THE INVENTION

The present invention is specifically directed to overcoming the above-enumerated problems in a novel and simple manner.

It is one objective of the present invention to rigidly connect blocks to a center belt without penetration of the center belt by a block fastener. The labor intensive and meticulous processes of aligning components and defining the bores in the blocks and center belt are avoided. Further, the center belt is not prone to crack propagation from points of stress concentration around bores. At the same time, weakening of the center belt between adjacent bores is avoided. It is a further objective of the invention to afford this rigid block connection without reducing the contact area between the blocks and a cooperating pulley surface so that high force transmission can occur without slippage as might detract from belt performance and reduce the useful life of the belt. These results can be achieved while affording a belt construction that can be economically manufactured.

To achieve these ends, a power transmission belt is provided having a center belt with a length, an inside surface, and an outside surface. Upper and lower blocks are provided and each has a leading face, a trailing face, and laterally oppositely facing pulley-engaging side surfaces. The upper and lower blocks are connected to each other to maintain the upper block, lower block and center belt together in an operative relationship without penetrating the center belt. At least one of the pulley-engaging side surfaces on at least one of the upper and lower blocks is uninterrupted between the leading and trailing faces on the one of the upper and lower blocks so that the at least one side surface can engage a cooperating pulley surface along an uninterrupted line between the leading and trailing faces of the at least one side surface.

Preferably, there are a plurality of lower blocks and upper blocks connected as described above.

To prevent relative lengthwise shifting between the center belt and blocks and maintain proper spacing and alignment of the blocks, the blocks and center belt have longitudinally spaced cooperating projections and recesses.

The present invention contemplates various different structures for connecting the upper and lower blocks. The connecting structure is preferably provided laterally outside of both lateral edges of the center belt.

In one form, a single element connects the upper and lower blocks. The element may be straight or U-shaped. In one form, the element is embedded in at least one of the upper and lower blocks. An enlargement can be provided on the element portion embedded in the blocks to enhance anchoring of the element.

In one form, the element wraps around a portion of the center belt. The wrapping of the element may extend to almost entirely around the circumference of the center belt.

To rigidify the connection between the blocks and center belt, in one form, the blocks are provided with an groove/undercut for reception of the center belt to prevent lateral shifting thereof relative to the blocks.

In one form, the connecting element has a portion embedded in one of the upper and lower blocks and is bent around to define a shoulder that bears the other of the upper and lower blocks against the center belt. In one version, the element is a U-shaped element and the base thereof is embedded in one of the upper and lower blocks. The legs of the U-shaped element are bent to each define a shoulder that bears against the other of the upper and lower blocks to urge the upper and lower blocks towards the center belt with the upper and lower blocks and center belt in operative relationship.

To accommodate the legs of the U-shaped elements, the other of the upper and lower blocks may be provided with a recess with a undercut surface therein against which the shoulders bear.

In one form, the other of the upper and lower blocks has spaced through bores to accommodate the legs. The through bores are preferably in communication with the recess.

With the upper block, lower block, and center belt in operative relationship, the legs of the U-shaped element can either be spaced form or flush against the center belt edges. In this latter condition, the center belt is captively held in operative relationship so as to thereby prevent lateral shifting between the center belt and blocks.

The invention further contemplates a power transmission belt having a center belt, upper and lower blocks, and an element extending between the upper and lower blocks without penetrating the center belt. The element extends into at least one of the upper and lower block elements to have at least a portion that is completely surrounded by the one of the upper and lower block elements.

With the inventive structure, the center belt and blocks can be consistently and rigidly coupled without penetration of the center belt. This avoids the tedious and expensive boring steps while at the same time maintaining the integrity of both the center belt and blocks. A high integrity belt, with good force transmission capability and a long useful life can be constructed economically according to the invention.

By embedding the fasteners in one of the upper and lower blocks before assembly, alignment of the blocks and the center belt is assured. By directing the fasteners in the one of the upper and lower blocks into accommodating bores in the other of the upper and lower blocks, and bending the fasteners over into the recesses, efficient and effective assembly can be carried out. The recesses accommodate the fasteners so that the fasteners need not project away from the block surfaces in which the recesses are formed.

In another aspect of the invention, a power transmission belt is provided having a center belt with a length, an inside surface, an outside surface, and laterally spaced side edges. The center belt includes an endless core element that is substantially rectangular as viewed in cross section taken transversely to the length of the center belt. A plurality of blocks are attached to at least one of the inside and outside surfaces of the center belt.

In one form, the core element is a single element extending substantially fully between the side edges of the center belt.

Because the core element is not prone to the variable force transmission associated with spirally wound cords, stable belt running occurs even when fasteners for the blocks are directed through the core element. The integrity of the belt is not compromised by directing bolts, rivets or the like, into the core element. The core element has sufficient strength that the life thereof is not appreciably compromised by the bores therein. Even in the absence of the bores, the core element affords an improvement by not being prone to vibration or shock by reason of forces being unequally applied through all laterally spaced spirally wound tension cords in a conventional construction. Longer belt life and more stable running result.

In one form, the blocks are attached in pairs with there being a fastener extending into each of the blocks in each block pair. The fasteners can extend through the center belt core element or to the side of the center belt. In one form, there is one and only one fastener in each block pair.

In one form, there are elastomeric layers defining at least one of the inside and outside center belt surfaces. The elastomeric material is at least one of a) at least one of natural rubber, styrene-butadiene rubber, chloroprene rubber, nitrile rubber, chlorosulfonated polyethylene, and a hydrogenated nitrile rubber, and b) polyurethane resin.

In one form, the core element is made from one of maraging steel, stainless steel, copper, zinc and brass. The core element has a thickness preferably in the range of 0.1 to 0.3 mm.

In one form, the fastener is one of a rivet and bolt that extends through the center belt and into each of the blocks in each block pair so that the center belt is held captively between the blocks and each block pair. The fastener may extend only partially, or fully, through the blocks in each block pair.

The invention further contemplates a power transmission belt having a center belt with an endless metal core element and a plurality of blocks attached thereto.

In another aspect of the invention, a power transmission belt is provided having a center belt with a length, an inside surface, and an outside surface. A plurality of blocks are attached in pairs, one each to the inside and outside center belt surfaces. A fastener is provided and defines a single axis.

In a preferred form, there is one and only one fastener for each block pair.

Resultingly, the belt can be made to have a narrow configuration. The smaller belt width results in only minimal buckling of the upper and lower blocks in use.

The center belt may have a metal core with an elastomeric material defining at least one of the inside and outside surfaces of the center belt.

By reason of interconnecting the blocks, the center belt is firmly captively maintained therebetween. Any force induced by a cooperating pulley on one of the upper and lower blocks is resisted also by the other of the upper and lower blocks for each pair. By reason of avoiding pivoting of the blocks, high force transmission capability is maintained under stable operating conditions.

DETAILED DESCRIPTION OF THE DRAWINGS

A first form of high-load power transmission belt, according to the present invention, is shown at 10 in FIGS. 1–4. The power transmission belt 10 has an endless center belt 12 and pairs of upper and lower blocks 14, 16, respectively, captively engaging the center belt 12 at regularly spaced intervals along the length of the center belt 12.

Figure 1:
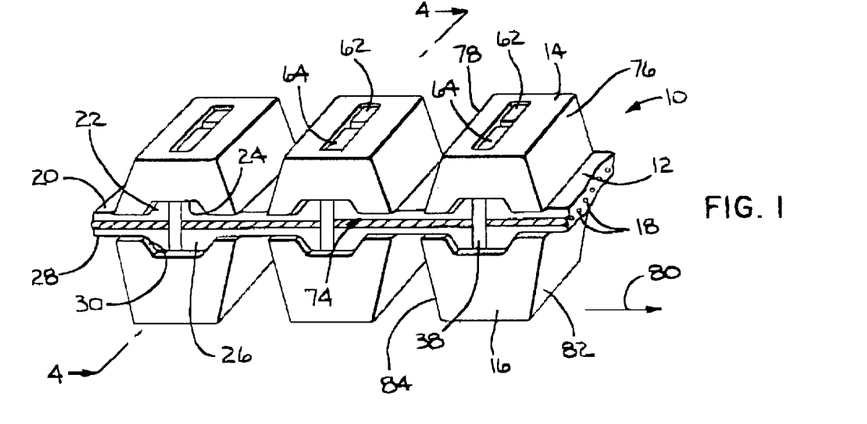
FIG. 1 is a fragmentary perspective view of a portion of a power transmission belt, with blocks mounted thereon according to the present invention.

The center belt 12 is preferably made from elastomeric material and has laterally spaced, load-carrying cords 18 embedded therein. The elastomeric material defining the center belt 12 can be formed from natural rubber (NR), styrene-butadiene rubber (SBR), chloroprene rubber (CR), nitrile rubber (NBR), chlorosulfonated polyethylene (Hypalon) and hydrogenated nitrile rubber (HNBR). These rubber materials can be used either alone or may be blended to produce the center belt 12. Alternatively, the center belt 12 can be made from a polyurethane resin.

The load-carrying cords 18 are made from a spirally wound material in rope form. The material has low ductility and high strength. Suitable compositions for the load-carrying cords 18 are glass fiber, aramid fiber, polyamide fiber, polyester fiber, metal wire, or the like.

The blocks 14, 16 are preferably constructed of a resin material that is more rigid than the elastomeric material in the center belt 12. More specifically, a rubber with a hardness of more than 90° or a resin material such as rigid polyurethane resin, liquid crystal resin, phenolic resin, epoxy resin, polyamide resin, polyester resin, acrylic resin, or methacrylate resin are suitable. Also contemplated by the invention is a resin material that is reinforced by short fibers such as cotton fibers, manmade fibers, glass fibers, metallic fibers, etc.

Figure 2:
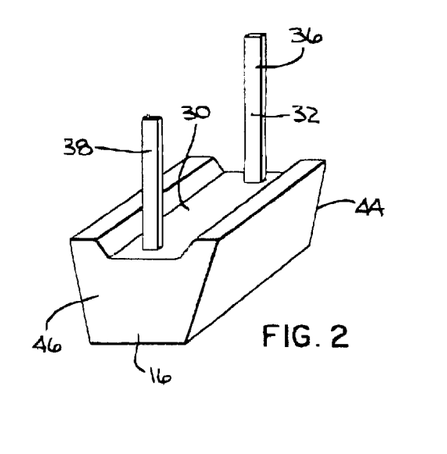
FIG. 2 is a perspective view of a lower block on the power transmission belt of FIG. 1.
Figure 3:
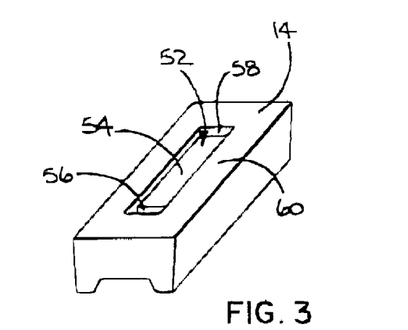
FIG. 3 is a perspective view of an upper block on the power transmission belt of FIG. 1, with the upper block connectable to the lower block in FIG. 2 to define a block pair.

The outside surface 20 of the center belt 12 has regularly spaced projections 22 thereon to cooperate with recesses 24 in the upper blocks 14. The cooperating projections 22 and recesses 24 limit lengthwise relative movement between the center belt 12 and the upper blocks 14 and consistently align the blocks 14, 16 on the center belt 12 during manufacture. Similar projections 26 are provided on the inside surface 28 of the center belt 12 to cooperate with recesses 30 in the lower blocks 16. This arrangement of projections 22, 26 and recesses 24, 30, in addition to maintaining the relative lengthwise positions of the center belt 12 and blocks 14, 16, inhibits rotation of the blocks 14, 16 relative to the center belt 12. This same result can be achieved by providing projections on one or both of the upper and lower blocks 14, 16, with cooperating recesses on the center belt 12. Still further, cooperating projections or recesses can be provided on only one of the blocks 14, 16, in each block pair.

One aspect of the present invention relates to the connection of the blocks 14, 16 to the center belt 12. To accomplish this, a fastener 32 is employed. The fastener 32 is preferably a formed metal element/wire having a round, and more preferably, a square or rectangular cross section. The fastener 32 is generally U-shaped with a base portion 34 and legs 36, 38 projecting away from the base portion 34. Angled leg portions 40, 42 project from the base 34 and follow the contour of pulley-engaging side surfaces 44, 46 on the lower block 16. The legs 36 project from the portions 40, 42 substantially vertically and parallel to each other. The lower block 16 and fastener 32 are preformed as a subassembly by embedding the base portion 34 and a part of the legs 36, 38 therein.

Figure 4:
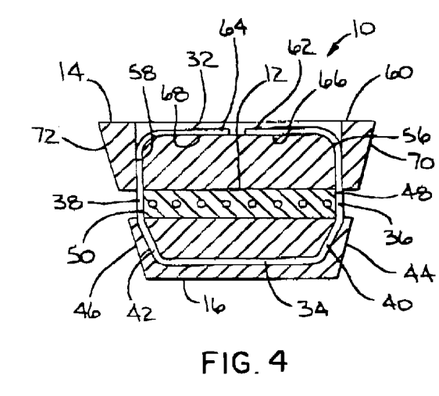
FIG. 4 is a cross-sectional view of the power transmission belt taken along line 4—4 of FIG. 1 and showing a fastener for mounting the upper and lower blocks in pairs on the belt.

The portions of the legs 36, 38 projecting from the block 16 are spaced to closely straddle the edges 48, 50 of the center belt 12 to thereby maintain lateral alignment between the blocks 14, 16 and center belt 12. Those portions of the legs 36, 38 projecting to above the center belt 12 are operatively connected to the upper block 14.

The block 14 has a recess 52 wherein bounded by an undercut surface 54. Through bores 56, 58 communicate with the recess 52 and accommodate the fastener legs 36, 38, which are sufficiently long to project upwardly through the bores 56, 58 to upwardly beyond the outer surface 60 of the block 14.

To complete the assembly of the block pair 14, 16, the free ends 62, 64 of the legs 36, 38 are bent over so that shoulders 66, 68 thereon bear against the undercut surface 54 to thereby captively hold the center belt 12 between the blocks 14, 16. The bent ends 62, 64 reside fully within the recess 52 so as to not project above the outer surface 60 of the block 14.

With the blocks 14, 16 in assembled/operative relationship with the center belt 12, pulley-engaging side surfaces 70, 72, which are substantially flat, reside in the planes of the side surfaces 44, 46, respectively, on the block 16. The center belt edges 48, 50 are spaced laterally inwardly from the planes of the surfaces 44, 70 and 46, 72, respectively, so that there is a gap 74 between the blocks 14, 16 wherein the blocks 14, 16 do not engage a cooperating pulley (not shown).

With the blocks 14, 16 and center belt 12 in operative relationship, the block 14 defines an angled leading face 76 and a trailing face 78 with the belt 10 advanced in the direction of arrow 80 in FIG. 1. The blocks 16 have corresponding leading faces 82 and trailing faces 84.

The inventive structure not only produces a highly durable belt with excellent tensile strength and side pressure resistance, but also makes possible facilitated and economical construction. The preassembled block 16 and fastener 32 can be conveniently aligned with a projection 26 on the center belt 12 and directed upwardly relative thereto, with the legs 36, 38 straddling the center belt 12 and guiding vertical movement of the block 16 relative thereto. The upper block 14 can then be directed onto the fastener legs 36, 38 which are then bent over into the recess 52.

In addition to facilitating manufacture, the present invention does not require that the fasteners 32 penetrate the center belt 12 as might cause weakening thereof, as described more fully below. Further, this obviates the need to perform additional boring steps to accommodate the fasteners 32.

A still further advantage of the present invention is the fact that the pulley-engaging side surfaces 44, 46, 70, 72 are unaltered by the fasteners 32. The advantages of this can be seen by viewing a prior art belt, as shown at 86 in FIG. 7. The belt 86 has an upper block 88 and a lower block 90, which blocks 88, 90 are held together to captively engage a center belt 92.

Figure 7:
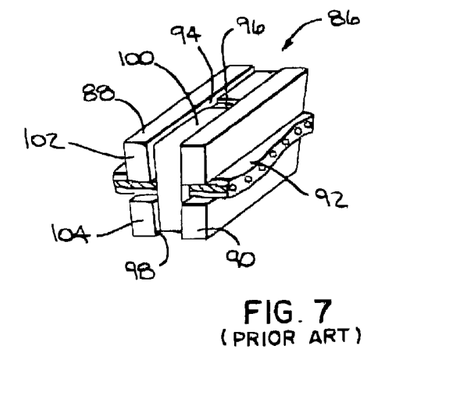
FIG. 7 is a fragmentary, perspective view of a prior art power transmission belt.

The block 88 has a groove/recess 94 about its periphery around an undercut surface 96. A similar recess 98 is provided in the lower block 90. For recesses 94, 98 accommodate a metal fastener 100 which is wrapped substantially entirely around the circumference of the belt 86 within the recess 94, 98, so as not to project outwardly therefrom.

Because the recesses 94, 98 extend around three sides of the blocks 88, 90, the rigidity of the blocks 88, 90 is affected. Still further, the pulley-engaging side surface 102 (one shown) on the block 88 and surface 104 (one shown) on the block 90 are interrupted by the recesses 94, 98, respectively. Accordingly, the surface area of the block 88, 90 that is engageable with a cooperating pulley (not shown) is diminished which thereby alters the drive capabilities for the belt 86.

Because the pulley-engaging side surfaces 44, 46, 70, 72 in the inventive belt 10 are not interrupted, there is a continuous line of contact between the leading faces 76, 82 and trailing faces 78, 84 on the blocks 14, 16, respectively. Excellent force transmission capability is thus realized. Further, the integrity of the center belt 12 and blocks 14, 16 is not significantly affected by the structure for interconnecting these blocks 14, 16 and center belt 12.

Figure 5:
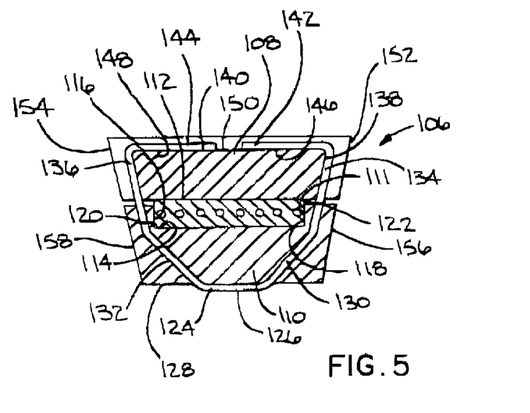
FIG. 5 is a view as in FIG. 4 showing a modified form of fastener for the upper and lower mounting blocks.

A modified form of power transmission belt, according to the invention, is shown at 106 in FIG. 5. The power transmission belt 106 has an upper block 108, a lower block 110, and a center belt 112 operatively connected in the same general fashion as corresponding elements on the power transmission belt 10.

In one preferred form, the blocks 108, 110 are molded from 4,6 nylon resin or aramid resin is used. The center belt is made from chloroprene rubber with polyamide fiber load-carrying cords embedded therein. The materials previously described for corresponding belt elements are also suitable.

The lower block 110 has an undercut surface 114 defining a recess 111 for close reception of the bottom of the center belt 112. The facing side walls 116, 118 bounding the recess 111 facially engage the center belt edges 120, 122 to prevent relative lateral movement between the center belt 112 and lower block 110. It is contemplated that the recess 111 could be provided in either the upper or lower blocks in all embodiments for the invention disclosed herein.

A deformable, metal fastener 124 has a base portion 126 that is exposed at the bottom surface 128 of the lower block 110. Legs 130, 132 project upwardly from the base 126 at two different angles through the block 110 to above the lower block 110. The leg portions 134, 136 project into a recess 138 in the upper block 108 formed on three sides thereof. The recess 138 is bounded by an undercut surface 140 against which the leg portions 134, 136 are closely bent. The free leg ends 142, 144 define shoulders 146, 148 to bear against the upper block surface 150 to captively hold the blocks 108, 110 and center belt 112 in operative relationship.

While the recess 138 does interrupt the pulley-engaging side surfaces 152, 154 of the upper block 108, the pulley-engaging side surfaces 156, 158 on the lower block 110 are unaltered so as to provide a substantial area to engage a cooperating pulley (not shown).

Figure 6:
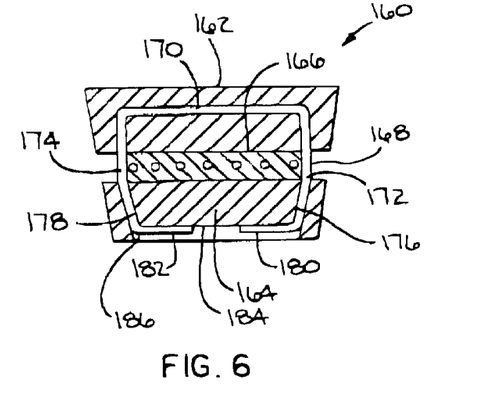
FIG. 6 is a view as in FIGS. 4 and 5 with a still further modified form of fastener.

In FIG. 6, a modified form of power transmission belt, according to the present invention, is shown at 160. The belt 160 is constructed substantially as the belt 10, previously described, to include an upper block 162, lower block 164 and center belt 166 therebetween. A U-shaped fastener 168 connects between the blocks 162, 164 and maintains the blocks 162, 164 and center belt 166 in operative relationship. Instead of embedding the fastener 168 in the lower block 164 as with the belt 10, the fastener 168 is inverted and has a base 170 embedded in the upper block 162 so that legs 172, 174 project downwardly into bores 176, 178 in the lower block 164. The free fastener ends 180, 182 are bent against a downwardly facing undercut surface 184 bounding a recess 186.

Figure 8:
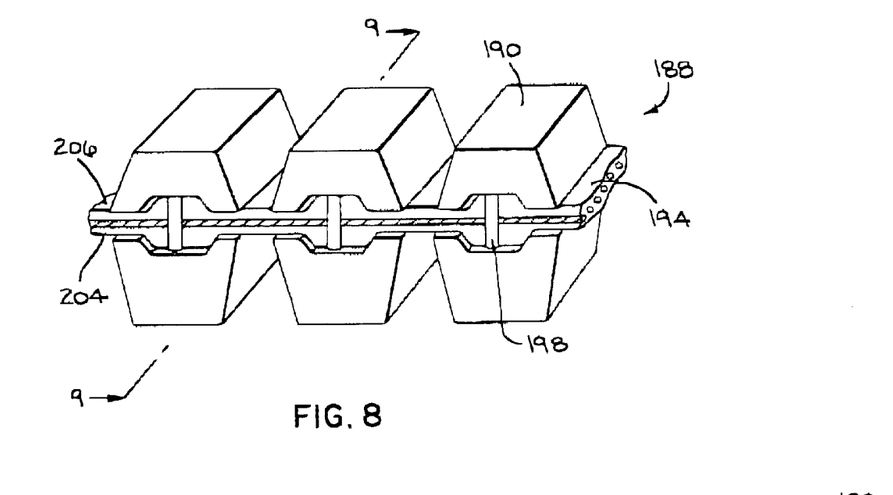
FIG. 8 is a fragmentary, perspective view of a modified form of power transmission belt, according to the present invention.
Figure 9:
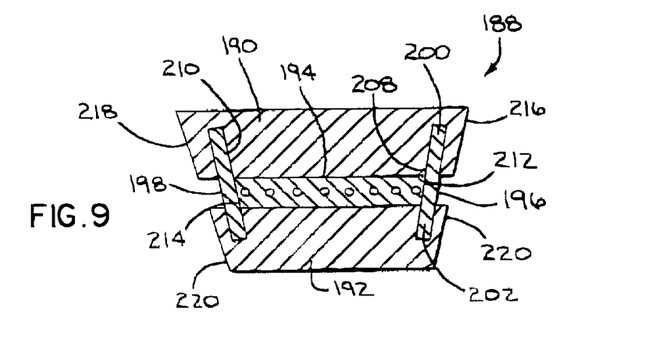
FIG. 9 is a cross-sectional view of the power transmission belt taken alone line 9—9 of FIG. 8 and showing one form of block fastener.

A modified form of power transmission belt, according to the present invention, is shown at 188 in FIGS. 8 and 9. The power transmission belt has upper and lower blocks 190, 192, respectively, captively engaging a center belt 194 in the same general fashion as the corresponding elements in the belt 10. The same materials making up the blocks 14, 16 and center belt 12, previously described, can be used to construct the blocks 190, 192 and center belt 194.

The means for maintaining the blocks 190, 192 and center belt 194 in operative relationship are laterally spaced fastener elements 196, 198, both of which are substantially straight. The element 196 has ends 200, 202 which are embedded in the upper block 190 and lower block 192 to be fully surrounded by the blocks 190, 192. The fastener element 198 is similarly connected to the block 190, 192.

In a preferred form, each fastener element 196, 198 is made from metal and has a cylindrical shape in cross section.

To fabricate the belt 188, molds (not shown) are provided at the inside center belt surface 204 and outside center belt surface 206. The blocks 190, 192 are molded in place on the center belt 194. The stock for the blocks 190, 192 is introduced to the molds, chilled, and hardened to complete manufacture.

With the above construction, the fastener elements 196, 198 effect a rigid connection between the blocks 190, 192 with precise alignment of the blocks 190, 192. In a preferred form, the length of the fastener elements 196, 198 is angled slightly from vertical so that the inside edges 208, 110 of the fastener elements 196, 198 abut spaced edges 212, 214 of the center belt 194 along its entire vertical extent. The fastener elements 196, 198 thereby prevent relative lateral movement between the center belt 194 and the blocks 190, 192.

No holes need be bored in the center belt 194 so that this manufacturing step is eliminated and the integrity of the center belt 194 is maintained. Still further, the pulley-engaging side surfaces 216, 218 on the block 190 and 220, 222 on the block 192 are uninterrupted so as to maximize the contact area between the surfaces 216, 218, 220, 222 and a cooperating pulley (not shown).

Figures 10, 11, 12, 13:
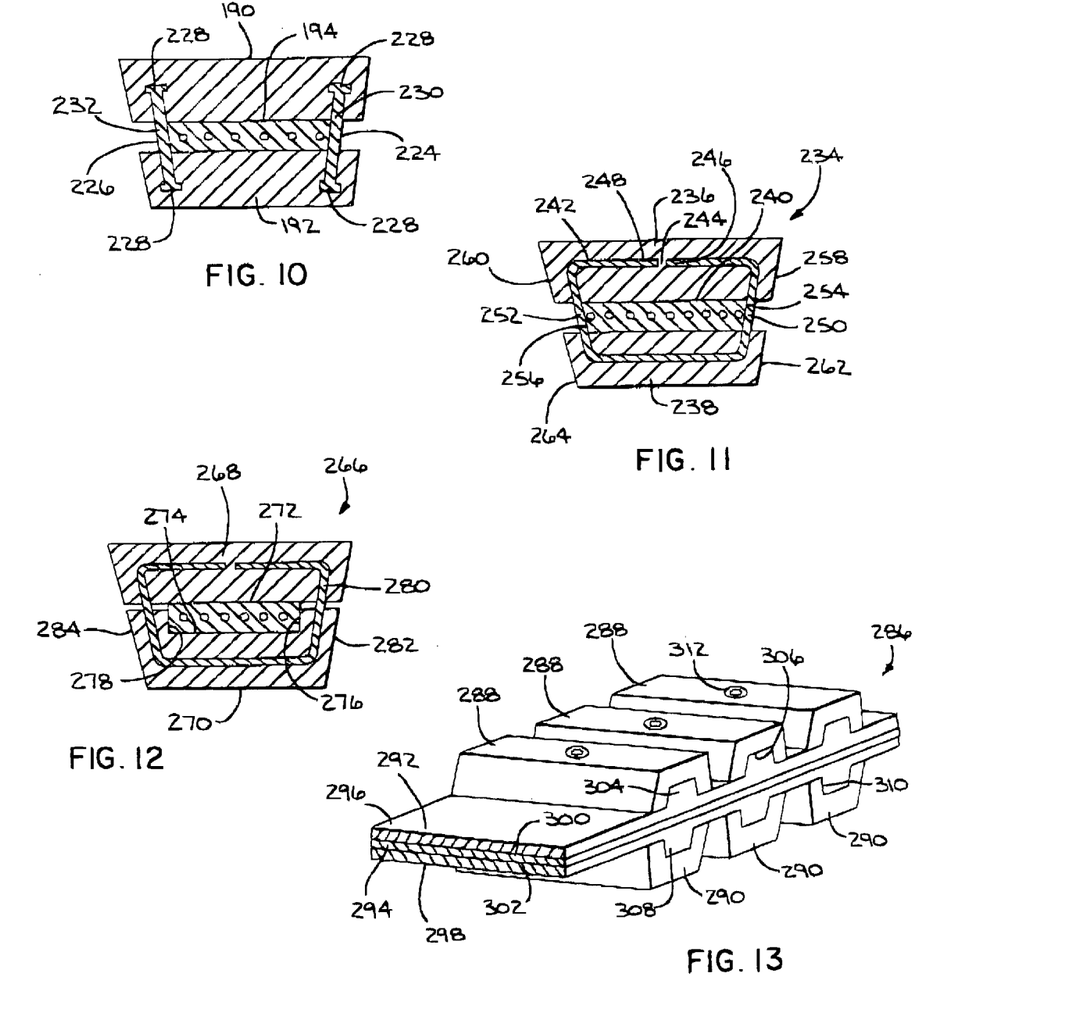
FIG. 10 is a view as in FIG. 9 with a modified form of block fastener according to the present invention.
FIG. 11 is a view as in FIGS. 9 and 10 showing a still further modified form of block fastener according to the present invention.
FIG. 12 is a view as in FIG. 11 with a modified form of lower block.
FIG. 13 is a fragmentary, perspective view of a further modified form of power transmission belt according to the present invention.
Figure 14:
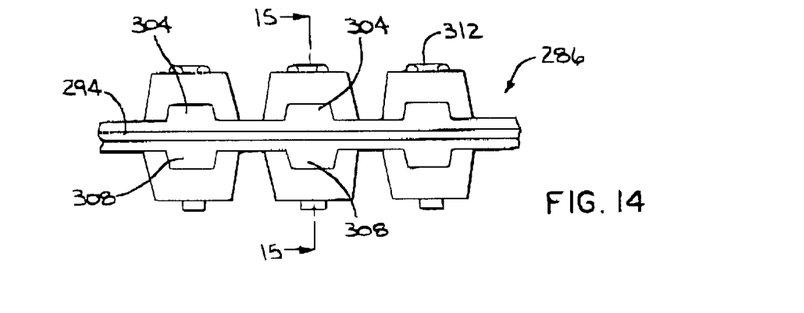
FIG. 14 is a side elevation view of the power transmission belt of FIG. 13.

A modified form of fastener element is shown in FIG. 10. Fastener elements 224, 226 correspond to the fastener elements 196, 198, on the belt 188. Belt components in FIG. 10, that are the same as those in FIG. 9, are correspondingly numbered.

The principal difference between the fastener elements 224, 226 and those 196, 198 in FIG. 9 is that the fastener elements 224, 226 have enlargements 228 on their ends. The enlargements enhance the hold of the blocks 190, 192 on the fastener elements 224, 226.

In a preferred form, the bodies 230, 232 of the fastener elements 224, 226, respectively, are cylindrical and the enlargements 228 are similarly cylindrical with a larger diameter. However, the invention contemplates virtually an infinite number of different shapes for the enlargement i.e. spherical, polygonal, etc.

A further modified form of belt is shown at 234 in FIG. 11. The belt 234 has an upper block 236 and a lower block 238 which captively engage a center belt 240 that is narrower than the blocks 236, 238.

A fastener 242 is formed substantially in the shape of a rectangle with there being a slight space 244 between the free ends 246, 248 of the fastener 242.

The fastener 242 is embedded in each of the upper and lower blocks 236, 238 to firmly maintain the connection therebetween. Exposed portions 250, 252 of the fastener 232 align with and abut angled edges 254, 256 of the center belt 240 along the entire vertical extent thereof. The fastener portions 250, 252 prevent lateral movement between the blocks 236, 238 and center belt 240.

This construction is preferred for its high strength. The fastener 232 is positively embraced by the blocks 236, 238. This construction also realizes the advantages of not having to penetrate the center belt 240 and not reducing the area of the pulley-engaging side surface 258, 260, 262, 264 on the blocks 236, 238.

A modified form of power transmission belt, according to the present invention, is shown at 266 in FIG. 12. The belt 266 has an upper block 268, a lower block 270 and a center belt 272 therebetween. The difference between the belt 266 and that 234 in FIG. 11 is that the lower block 270 is thickened and has a recess 274 therein to closely accept the lower portion of the center belt 272. The facing surfaces 276, 278 bounding the recess 274 prevent relative lateral movement between the lower block 270 and center belt 272.

The construction of the fastener 280 is substantially the same as the fastener 242, however, the fastener 280 does not directly engage the center belt 272 on the belt 266.

A further advantage afforded by situating the center belt 272 in a recess in the lower block 270 is that the pulley-engaging side surfaces 282, 284 and the block 270 can be extended vertically further than in the absence of the recess 274 to enlarge the contact area between the block 270 and a cooperating pulley (not shown). This enhances the drive capabilities of the belt.

Another aspect of the invention is the provision of a center belt that has high integrity even if penetrated by bolts, rivets, or the like. More specifically, the power transmission belt, according to the present invention, with this feature incorporated, is shown in FIGS. 13–16 at 286. The power transmission belt 286 is constructed similarly to the belts previously described, to include upper blocks 288 and lower blocks 290 joined in pairs to captively embrace a center belt 292. The center belt 292 and blocks 286, 288 are flush at the sides of the belt 286.

Figure 15:
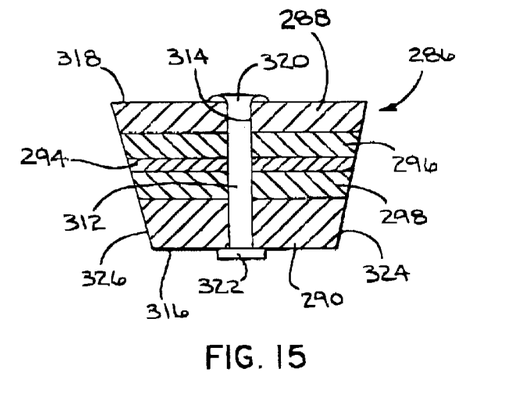
FIG. 15 is a cross-sectional view of the power transmission belt taken along line 15—15 of FIG. 14 showing one of the block fasteners.
Figure 16:
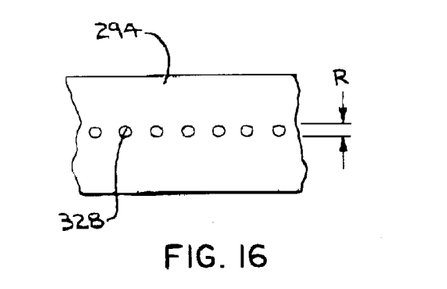
FIG. 16 is a fragmentary plan view of a core element on the center belt, in the power transmission belt of FIGS. 13–15, to which the blocks are attached.

The center belt 292 has a core element 294 with elastomeric layers 296, 298 on its upper and lower surfaces 300, 302, respectively. The elastomeric layer 296 has integrally formed projections 304 for reception in recesses 306 in the upper blocks 288. The elastomeric layer 298 has corresponding projections 308 for reception in recesses 310 in the lower blocks 290.

The composition of the elastomeric layers 296, 298 and upper and lower blocks 288, 290 can be made the same as that for corresponding elements in the previously described embodiments. One preferred center belt construction is to use chloroprene rubber with polyamide fiber cords embedded therein.

Fasteners 312 are used to maintain the blocks 288, 290 and center belt 292 in operative relationship. The fasteners 312 are shown as rivets, but may be bolts, or the like. The rivets 312 are directed into a through bore 314 from the underside 316 of the belt 266 to upwardly of the outside surface 318 of the belt 286. The exposed free end 320 of the rivet 312 is deformed to define an enlargement that captively embraces the belts 286 in conjunction with the enlarged head 322 of the rivet 312.

Instead of using spirally wound cords, an endless metal core element 294 is used. The core element 294 has a rectangular cross section and preferably extends fully between the pulley-engaging side surfaces 324, 326 of the belt 286. The core element 294 transmits driving forces uniformly and positively, unlike spirally wound cords which may be non-uniformly stressed during use and which are slightly misaligned with the belt length.

The core element 294 is preferably an endless metal band having a thickness of 0.1 to 0.3 mm. If the core element 294 has a thickness less than 0.1 mm, it does not afford the required strength to withstand high loads for long periods of time. On the other hand, a thickness of greater than 0.3 mm for the core element 294 results in an unacceptable diminishing of the belt flexibility. Further, the overall thickness of the belt becomes undesirably large.

In a preferred form, the core element is made from steel, such as SUS and maraging steel. Alternatively, the core element 294 can be made from copper, zinc, brass, and other suitable materials, and most preferably metal.

Figures 20, 21, 22, 23:
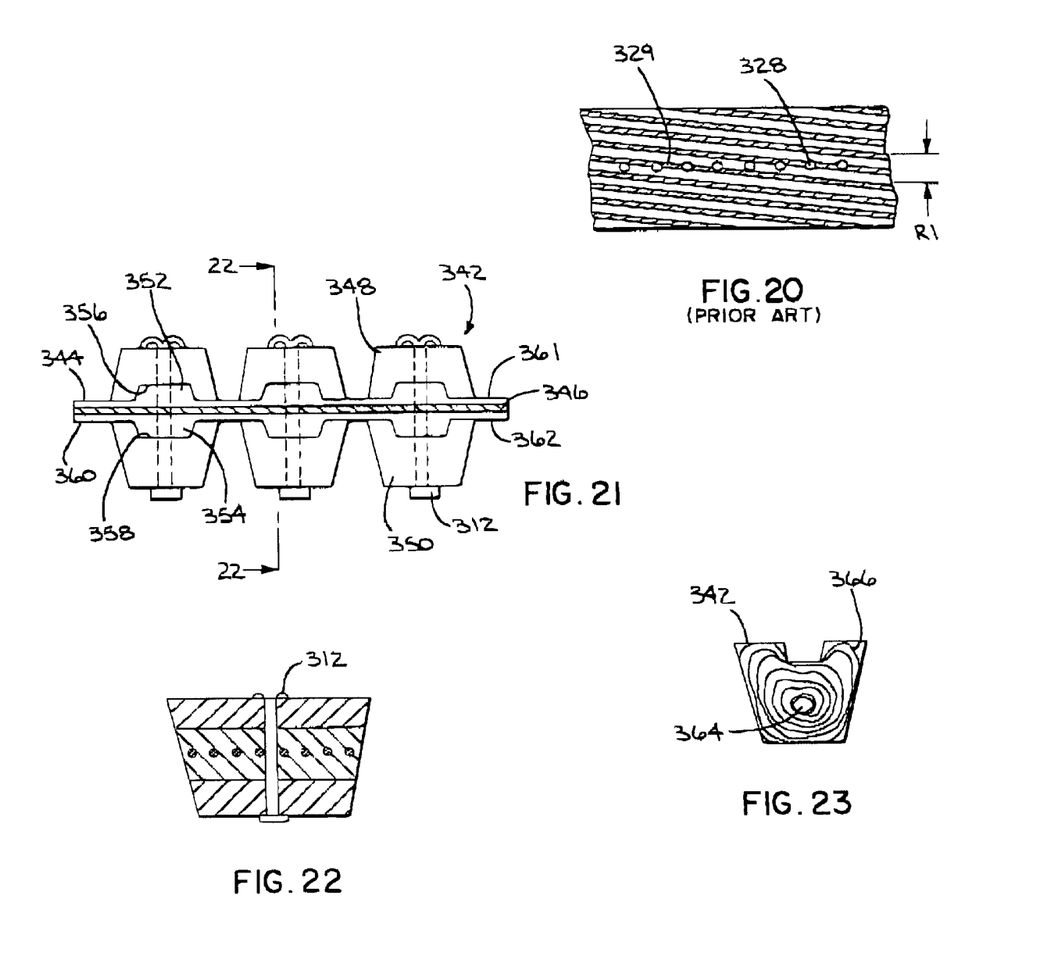
FIG. 20 is a fragmentary, plan view of the core element on a conventional center belt.
FIG. 21 is a fragmentary, side elevation view of a further modified form of power transmission belt, according to the present invention.
FIG. 22 is a cross-sectional view of the power transmission belt taken alone line 22—22 of FIG. 21.
FIG. 23 is a schematic representation of the cross section of one preferred type of block having wrapped layers around a core element.

The core element 294 is preferably pre-drilled to define equidistantly spaced through bores 328. Because the centers of the through bores 328 are laterally aligned, the weakening of the core element 294 caused by the bores 328 is limited to a lateral dimension R in FIG. 16, which is equal to the diameter of the bores 328. This weakened area, due to the bores, is significantly less in width that the weakened area in a conventional belt as shown in FIG. 20 herein. More specifically, this weakened width is identified by the distance R1 in FIG. 20, and is due, at least in part, to the bores penetrating and/or severing the load-carrying cords 329. With the inventive belt 286, the strength in a lengthwise direction is not significantly diminished by the bores 328.

The invention also contemplates incorporating the center belt into a power transmission belt without requiring penetration of the core element 294 by fasteners. Such a power transmission belt is shown at 330 in FIG. 17. The belt 330 has upper blocks 332 and lower blocks 334 held together by fasteners 336 in pairs to captively embrace the center belt 292. The blocks 332 have grooves/recesses 338 in three sides thereof to accommodate the fasteners 336. Similar grooves/recesses 340 are provided in the lower block 334 to accommodate the fasteners 336.

Figure 17:
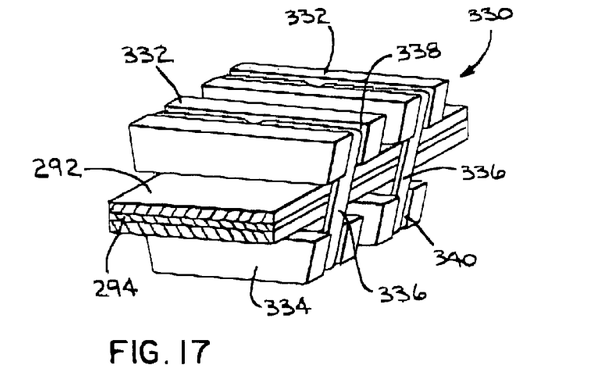
FIG. 17 is a fragmentary, perspective view of a further modified form of power transmission belt according to the present invention.

The fasteners 336 are wrapped through almost 360° around the circumference of the belt 330 in the same manner as the fasteners 100 shown in the prior art belt 86 in FIG. 7. The width of the center belt 292 is less than the width of the block 332, 334, to accommodate the fasteners 336.

The belt 330 has the advantage that the center belt 292 is not penetrated by the fasteners 336 and this there is no weakening whatsoever of the center belt 292 due to the fasteners 336. Thus, the center belt 292 has even improved characteristics attributable to the metal core element 294.

The performance of the inventive belt, of the type shown in FIGS. 13–17, was tested and compared to a conventional belt. The results are described below.

COMPARATIVE TESTING

The Inventive Belt

The inventive test belt had a center belt using a core element with chloroprene layers on the inside and outside surfaces thereof. The core element was a 0.2 mm thick endless band constructed of maraging steel. The upper and lower blocks were fiber-reinforced epoxy resin connected to the center belt using fasteners such as those 336 shown in FIG. 17. The width of the belt was 15 mm at the core element.

Conventional Belt

The conventional test belt was very similar to the inventive belt tested with the only difference being that the center belt did not have a metal core element but instead had spirally wound load-carrying cords embedded in an elastomeric component. The cords were made from aromatic polyamide. The inventive belt was 15 mm wide at the height of the load-carrying cords.

Test Setup

The tests were carried out with each belt trained around a driving pulley of 70 mm in diameter and a driven pulley of 116 mm in diameter. The belts were run at an ambient temperature of 90° C.

Transmission performance was tested by measuring the slip factor under various drive torques. To test durability, the life of the belt was measured as drive torque was varied.

Figure 18:
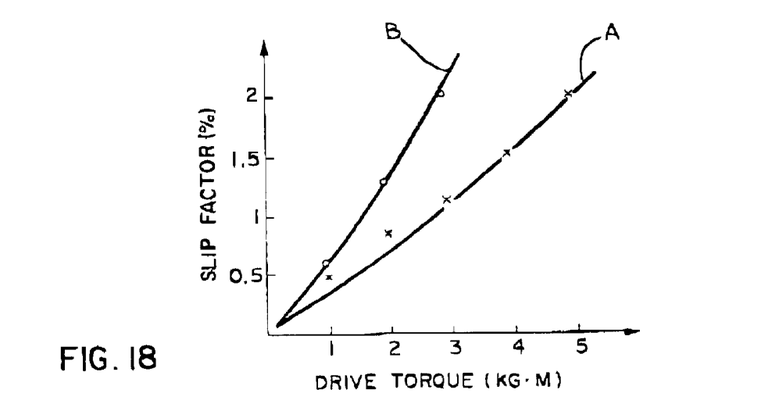
FIG. 18 is a graph plotting drive torque versus slip factor for both a conventional belt and an inventive belt.
Figure 19:
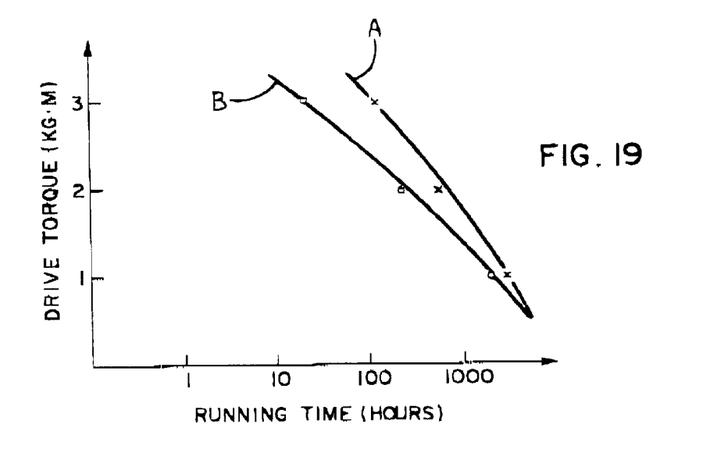
FIG. 19 is a graph plotting drive torque over a range of running times for both an inventive belt and a conventional belt.

The test results are graphed in FIGS. 18 and 19. The data from the inventive test belt is identified by A, while the data from the conventional test belt is identified by B. From the test results, it can be seen that the inventive belt was superior to the conventional belt in both transmission capabilities and durability.

In the belt 286 shown in FIGS. 13–16, a single fastener 312 is used to connect the blocks 288, 290 in each pair. The use of a single fastener has certain advantages in belts using spirally wound load-carrying cords as well as in belts having the inventive metal core element.

In FIGS. 21 and 22, a power transmission belt is shown at 342 having a center belt 344 with spirally wound load-carrying cords 346 therein. Upper and lower blocks 348, 350 are secured by a single fastener 312, which is in the form of a rivet, as previously described. Other types of fasteners are contemplated by the invention.

The center belt 344 has projections 352, 354 to cooperate with recesses 356, 358 on upper blocks 348 and lower blocks 350, respectively.

The load-carrying cords 346 are embedded in an elastomeric material 360 that can be the same as that used in the previously described center belts. Suitable compositions for the blocks 348, 350, cords 346 and material 360 have been previously described.

One to three canvas layers (not shown) can be provided on the upper surface 361 of the center belt 344. The canvas layer can be made of polyamide fiber canvas, aramid fiber canvas, bias canvas, wide-angle canvas, or stretchable canvas laminated to the center belt surface 361 in conventional manner.

The load-carrying cords 346 are preferably made from one of polyester, aliphatic polyamide, aramid, glass fiber, wire strands, or the like, that are spirally wound and embedded in the elastomeric layer 360.

One or more canvas layers, as used on the top surface 361, can be laminated to the bottom surface 362 of the center belt 344. Alternatively, stretchable canvas woven from textured crimped nylon fillings and conventional nylon warps can be utilized.

A single fastener 312 is located centrally of the blocks 348, 350. Because there is only a single fastener 312 used, the width of the belt 342 can be minimized. This narrow construction allows conformity of the belt 342 to cooperating pulleys without undesired buckling of the blocks 348, 350. Self alignment of the belt can be accomplished without any loss in power transmission.

Also, because the blocks 348, 350 are secured to each other, as they are in certain other embodiments disclosed herein, forces tending to rotate one of the upper and lower blocks 348, 350 is countered by the other of the upper and lower blocks 348, 350, which is squeezed against the center belt 344. By maintaining alignment of the blocks 348, 350, consistent power transmission capability is afforded. Thus, all advantages of a narrow belt are realized together with a higher load transmission capability.

A preferred construction for the block 342 is shown in FIG. 23. The block 342 has an epoxy resin core 364 about which a plurality of layers of glass fabric coated with an acrylic resin-containing chloroprene rubber are wrapped. The wrapped core 364 is compression-molded into the block shape. Alternatively, rigid, thermal setting urethane can be molded to produce the block 350.

Belts made according to the present invention were tested and compared with conventional type belts. The tests, and results therefrom, are described below.

COMPARATIVE TESTING DRIVE CAPABILITY

Test Setup

The test belts were trained around drive and driven pulleys. The drive pulley has a 70 mm diameter and the driven pulley a 116 mm diameter. An axial load of 150 kg was applied to the belt. The belt was run at 3200 rpm.

Inventive Belt

The inventive test belt was a B-type belt using one rivet to connect the upper and lower blocks. The blocks were made with an epoxy resin core and a glass fiber wrapped around the core. The glass fiber was coated with acrylic resin-containing chloroprene rubber. A center belt was made from chloroprene rubber with a polyamide fiber load-carrying cord embedded therein. The center belt had projections to cooperate with recesses in the blocks.

Conventional Belt

The conventional test belt has a B-type low edge cog belt made of chloroprene rubber and having a polyester core embedded therein. This belt is being commercially sold by the assignee herein as its Silver B-Type Cog™ belt.

Figure 24:
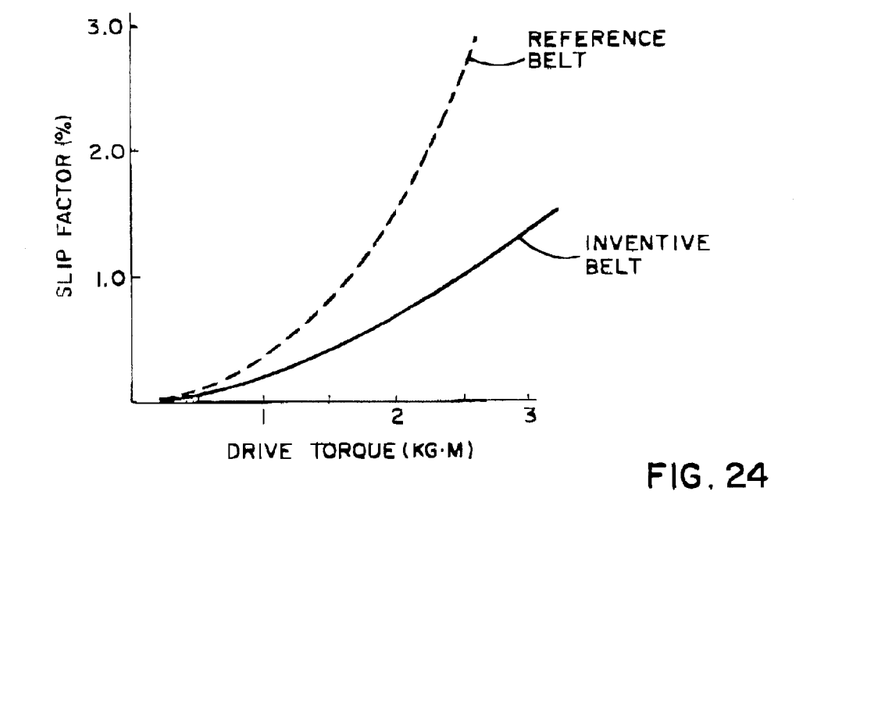
FIG. 24 is a graph plotting drive torque versus slip factor for an inventive belt and a conventional belt.

The results of this test are shown in FIG. 24.

DURABILITY TESTING

Further tests were conducted for purposes of comparing durability of the inventive belt and a conventional belt. A test setup was used having a drive pulley with a 70 mm diameter and a driven pulley of 116 mm in diameter. The belts were trained around the pulleys and driven at a speed of 3200 rpm. The ambient temperature was 90° C. The test was conducted to determine the relative useful lives of the belt.

Inventive Belt

The inventive test belt was a B-type belt using one rivet to attach the blocks. The blocks were compression molded with an epoxy resin core and a glass fabric wrapped around the core. The glass fabric was coated with acrylic resin-containing chloroprene rubber. The center belt was formed from chloroprene rubber with polyamide fiber load-carrying cords embedded therein. Projections were provided on the center belt to cooperate with recesses in the blocks.

Conventional Belt

The conventional test belt was a B-type low edge cog belt made of chloroprene rubber with a polyester cord embedded therein. This belt is being commercially sold by the assignee as its Silver B-Type Cog™ belt.

Figure 25:
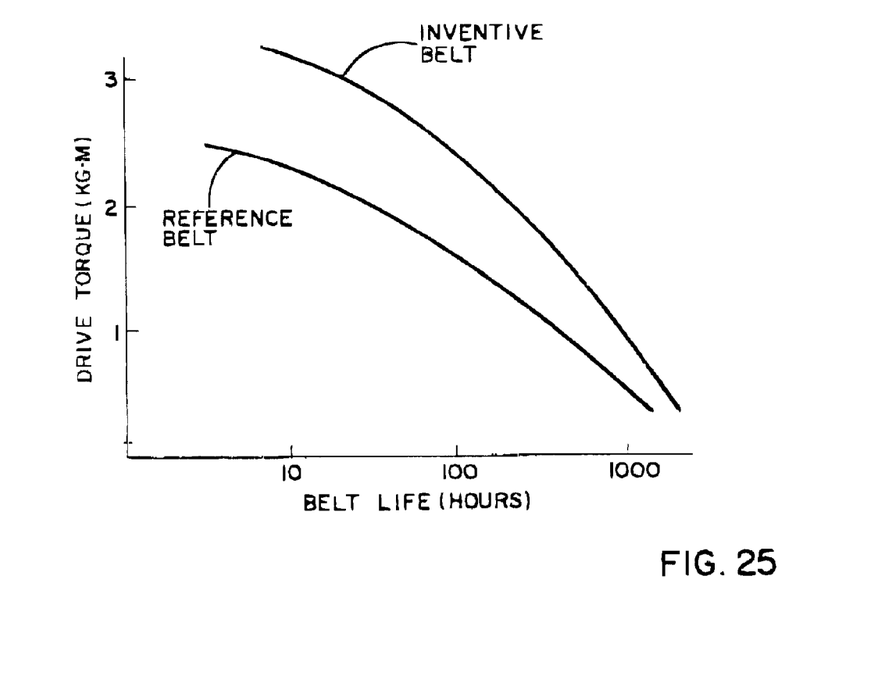
FIG. 25 is a graph plotting belt life versus drive torque for an inventive belt and a conventional belt.

The results of this test are shown in FIG. 25.

ADDITIONAL TESTING

The inventive belts were also tested on ACG-driven vehicles using a motor bus and a passenger car with diesel engines.

Motor Bus

The belt was trained around pulleys on the crank, ACG and pump shafts. The pulley diameter on the crank shaft was 190 mm, on the ACG shaft was 90 mm, and on the pump shaft was 140 mm. The crank shaft was operated at 100 rpm with an ACG load of 13 to 15 A.

Inventive Belts

Type 1—A B-type belt using one rivet was employed which had compression-molded blocks made up of an epoxy resin core and a glass fabric wrapped around the core. The glass fabric was coated with acrylic resin-containing chloroprene rubber. The center belt was formed of chloroprene rubber and polyamide fiber load-carrying cords therein. The center belt had projections to cooperate with recesses in the blocks.

Type 2—A B-type belt was made from polyamide resin with the upper and lower blocks fixed to the center belt through fasteners.

Conventional Belt

The conventional test belt was a B-type low edge cog belt made of chloroprene rubber and having a polyester core embedded therein (the Assignee's Silver B-Type Cog™ Belt).

Results

Nothing abnormal was found with the two types of inventive belts after 500 hours of running. The low edge cog belt failed, due to wear, after 400 hours of running.

Passenger Car

Belts were trained around pulleys on the crank shaft and ACG shaft. The crank shaft pulley had a diameter of 140 mm and the ACG pulley an 82 mm diameter. The crank shaft was run at 700 rpm (revolution variability 50%) with an ACG load of 25A.

Inventive Belt

The inventive test belt was an A-belt using the rivet to hold compression-molded blocks in place. The blocks were made with an epoxy resin core and a glass fabric wrapped therearound. The glass fabric was coated with acrylic resin-containing chloroprene rubber. The center belt was formed of chloroprene rubber with polyamide load-carrying cords embedded therein. Projections were provided on the center belt to accommodate the blocks.

Conventional Belt

The conventional test belt was an A-type low edge cog belt made of chloroprene rubber and having polyester load-carrying cords embedded therein. Short reinforcing fibers were provided in the compression rubber layer for purposes of providing resistance to abrasion.

Results

Nothing abnormal was found with the inventive belts after 500 hours of running. Failure due to wear was found with the low edge cog belt after 300 hours of running.

The foregoing disclosure of specific embodiments is intended to be illustrative of the broad concepts comprehended by the invention.

What is claimed is:

1. A power transmission belt comprising:
    a center belt having a length, an inside surface and an outside surface;
    an upper block having a leading face, a trailing face, and laterally oppositely facing pulley-engaging side surfaces;
    a lower block having a leading face, a trailing face, and laterally oppositely facing pulley-engaging side surfaces; and
    means for maintaining the upper block, lower block and center belt together in an operative relationship,
    said maintaining means comprising means for connecting the upper and lower blocks to each other without penetrating the center belt, at least one of the pulley-engaging side surfaces on at least one of the upper and lower blocks being uninterrupted between the leading and trailing faces on the one of the upper and lower blocks so that the at least one side surface can engage a cooperating pulley surface along an uninterrupted line between the leading and trailing faces of the at least one side surface.

2. The power transmission belt according to claim 1 wherein there are a plurality of lower blocks, upper blocks, and means for maintaining the upper blocks, lower blocks and center belt in operative relationship in the same manner as the upper block, lower block and center belt are maintained in operative relationship as recited in claim 1.

3. The power transmission belt according to claim 1 wherein one of one of the upper and lower blocks and center belt has a projection and the other of the one of the upper and lower blocks and center belt has a recess for reception of the projection, said projection and recess cooperating to limit relative lengthwise movement between the one of the upper and lower blocks and center belt and the other of the one of the upper and lower blocks and center belt.

4. The power transmission belt according to claim 1 wherein the center belt has laterally spaced edges and the connecting means extends between the upper and lower blocks laterally outside of each edge of the center belt.

5. The power transmission belt according to claim 4 wherein the connecting means comprises a single element.

6. The power transmission belt according to claim 1 wherein said connecting means comprises a substantially straight element extending between the upper and lower blocks.

7. The power transmission belt according to claim 6 wherein said straight element is embedded in at least one of the upper and lower blocks.

8. The power transmission belt according to claim 6 wherein the straight element has an end that extends into one of the upper and lower blocks and the one straight element end has an enlarged head.

9. The power transmission belt according to claim 1 wherein the center belt has laterally spaced edges and the connecting means comprises a formed element that wraps around at least one center belt edge and one of the inside and outside center belt surfaces.

10. The power transmission belt according to claim 1 wherein the center belt has laterally spaced edges and the connecting means comprises a formed element that continuously wraps around at least three of the laterally spaced center belt edges and the inside and outside center belt surfaces.

11. The power transmission belt according to claim 1 wherein at least one of the upper and lower blocks has an undercut to receive the center belt.

12. The power transmission belt according to claim 1 wherein the connecting means comprises an element that has an end embedded in one of the upper and lower blocks and is bent to define a shoulder that bears the other of the upper and lower blocks against the center belt.

13. The power transmission belt according to claim 12 wherein the other of the upper and lower blocks has a recess with an undercut surface therein against which the shoulder bears with the upper and lower blocks and center belt in operative relationship.

14. The power transmission belt according to claim 13 wherein the outer of the upper and lower blocks has a through bore communicating with the recess and the element extends through the through bore and into the recess with the upper and lower blocks and center belt in operative relationship.

15. The power transmission belt according to claim 1 wherein the connecting means comprises a U-shaped element with a base and spaced legs.

16. The power transmission belt according to claim 15 wherein the base of the U-shaped element is embedded in one of the upper and lower blocks and the legs of the U-shaped element are bent to each define a shoulder that bears against the other of the upper and lower blocks to urge the upper and lower blocks towards the center belt with the upper and lower blocks and center belt in operative relationship.

17. The power transmission belt according to claim 16 wherein the other of the upper and lower blocks has spaced through bores and the legs extend one each through the through bores in the other of the upper and lower blocks.

18. The power transmission belt according to claim 17 wherein the other of the upper and lower blocks has a recess in communication with the through bores in the other of the upper and lower blocks.

19. The power transmission belt according to claim 16 wherein the center belt is held captively between the legs of the U-shaped element with the upper block, lower block and center belt in operative relationship.

20. A power transmission belt comprising:
 a center belt having a length, an inside surface, an outside surface, and laterally spaced edges;
 an upper block having a leading face, a trailing face, and laterally oppositely facing pulley-engaging side surfaces;
 a lower block having a leading face, a trailing face, and laterally oppositely facing pulley-engaging side surfaces; and
 means for maintaining the upper block, lower block and center belt together in an operative relationship,
 said maintaining means comprising an element that extends between the upper and lower block elements without penetrating the center belt,
 said element extending into at least one of the upper and lower block elements to have at least a portion that is completely surrounded by the one of the upper and lower block elements.

21. The power transmission belt according to claim 20 wherein one of one of the upper and lower blocks and center belt has a projection and the other of the one of the upper and lower blocks and center belt has a recess for reception of the projection, said projection and recess cooperating to limit relative lengthwise movement between the one of the upper and lower blocks and center belt and the other of the one of the upper and lower blocks and center belt.

22. The power transmission belt according to claim 20 wherein said connecting means comprises a single element.

23. The power transmission belt according to claim 20 wherein said connecting means comprises a substantially straight element extending between the upper and lower blocks.

24. The power transmission belt according to claim 23 wherein the straight element has an end that extends into one of the upper and lower blocks and the one straight element end has an enlarged head.

25. The power transmission belt according to claim 20 wherein the element is a formed metal element that wraps around at least one center belt edge and one of the inside and outside center belt surfaces.

26. The power transmission belt according to claim 20 wherein at least one of the upper and lower blocks has an undercut to receive the center belt.

27. The power transmission belt according to claim 20 wherein the element has an end embedded in one of the upper and lower blocks and is bent to define a shoulder that bears the other of the upper and lower blocks against the center belt.

28. The power transmission belt according to claim 27 wherein the other of the upper and lower blocks has a recess with an undercut surface therein against which the shoulder bears with the upper and lower blocks and center belt in cooperative relationship.

29. The power transmission belt according to claim 28 wherein the other of the upper and lower blocks has a through bore communicating with the recess and the element extends through the through bore and into the recess with the upper and lower block and center belt in operative relationship.

30. The power transmission belt according to claim 20 wherein the element is U-shaped with a base and spaced legs and the base of the U-shaped element is embedded in one of the upper and lower blocks and the legs of the U-shaped element are bent to each define a shoulder that bears against the other of the upper and lower blocks to urge the upper and lower blocks towards the center belt with the upper and lower blocks and center belt in operative relationship.

31. The power transmission belt according to claim 30 wherein the other of the upper and lower blocks has spaced through bores and the legs extend one each through the through bores in the other of the upper and lower blocks.

32. The power transmission belt according to claim 30 wherein the center belt is held captively between the legs of the U-shaped element with the upper block, lower block and center belt in operative relationship.

\* \* \* \* \*